US010909570B2

(12) United States Patent
Srivastava et al.

(10) Patent No.: US 10,909,570 B2
(45) Date of Patent: Feb. 2, 2021

(54) METHODS, SYSTEMS, AND COMPUTER READABLE MEDIA FOR SUPPRESSING COOKIE BASED ADVERTISEMENT RETARGETING

(71) Applicant: MasterCard International Incorporated, Purchase, NY (US)

(72) Inventors: Shubhra Srivastava, Scarsdale, NY (US); Serge Bernard, Danbury, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 563 days.

(21) Appl. No.: 15/374,653

(22) Filed: Dec. 9, 2016

(65) Prior Publication Data

US 2018/0165709 A1 Jun. 14, 2018

(51) Int. Cl.
*G06Q 30/02* (2012.01)
*G06Q 30/06* (2012.01)

(52) U.S. Cl.
CPC ..... *G06Q 30/0251* (2013.01); *G06Q 30/0601* (2013.01)

(58) Field of Classification Search
CPC combination set(s) only.
See application file for complete search history.

(56) References Cited

U.S. PATENT DOCUMENTS

| 2014/0122245 A1* | 5/2014 | Qu | G06Q 30/0269 705/14.66 |
| 2015/0317674 A1* | 11/2015 | Ghosh | G06Q 20/40 705/14.53 |
| 2016/0078477 A1* | 3/2016 | Chik | G06Q 30/0241 705/14.53 |
| 2016/0117727 A1* | 4/2016 | Campbell | G06Q 30/0256 705/14.54 |

(Continued)

FOREIGN PATENT DOCUMENTS

CN 100380341 C * 4/2008 ......... G06Q 30/0625

OTHER PUBLICATIONS

Yeo et al, "Predicting Online Purchase Conversion for Retargeting", Jun. 10, 2017, www.cmo.com/features/articles/2013/11/20/15_Stats_Retargeting, pp. 591-600 (Year: 2017).*

(Continued)

*Primary Examiner* — Marie P Brady
(74) *Attorney, Agent, or Firm* — Jenkins, Wilson, Taylor & Hunt, P.A.

(57) ABSTRACT

Methods, systems, and computer readable media for suppressing cookie based advertisement retargeting are disclosed. One method includes receiving a digital identifier and a merchant identifier associated with a purchase transaction. The method further includes determining, using the digital identifier and the merchant identifier, whether a cookie exists for advertisement retargeting related to the digital identifier and the merchant identifier. The method also includes in response to determining that the cookie (Continued)

exists for advertisement retargeting related to the digital identifier and the merchant identifier, sending suppression information for suppressing advertisement retargeting associated with the cookie.

18 Claims, 6 Drawing Sheets

(56) References Cited

U.S. PATENT DOCUMENTS

| | | | | |
|---|---|---|---|---|
| 2016/0225022 | A1* | 8/2016 | Kurapati | G06F 16/958 |
| 2017/0091817 | A1* | 3/2017 | Lenhart | G06Q 30/0255 |
| 2018/0005279 | A1* | 1/2018 | Battaglini | G06Q 30/0269 |
| | | | | 705/14.66 |

OTHER PUBLICATIONS

"Behavorial retargeting," Wikipedia, the free enclyclopedia, wayback machine, https://en.wikipedia.org/wiki/Behavioral_retargeting, pp. 1-2 (Nov. 11, 2016).

"Data onboarding," Wikipedia, the free enclyclopedia, wayback machine, https://en.wikipedia.org/wiki/Data_onboarding, pp. 1-2 (Nov. 29, 2015).

"HTTP cookies," Wikipedia, the free enclyclopedia, wayback machine, https://en.wikipedia.org/wiki/HTTP_cookie, pp. 1-16 (Nov. 8, 2016).

"Targeted advertising," Wikipedia, the free enclyclopedia, wayback machine, https://en.wikipedia.org/wiki/Targeted_advertising, pp. 1-11 (Sep. 27, 2016).

"Web beacon," Wikipedia, the free enclyclopedia, wayback machine, https://en.wikipedia.org/wiki/Web_beacon, pp. 1-4 (Oct. 5, 2016).

* cited by examiner

| DIGITAL ID | MERCHANT ID | COOKIE ID |
|---|---|---|
| S | A23 | A |
| X | B23 | B |
| T | T57 | C |
| U | K89 | D |
| D | M33 | E |

METHODS, SYSTEMS, AND COMPUTER READABLE MEDIA FOR SUPPRESSING COOKIE BASED ADVERTISEMENT RETARGETING

TECHNICAL FIELD

The subject matter described herein relates to processing information. More specifically, the subject matter relates to methods, systems, and computer readable media for suppressing cookie based advertisement retargeting.

BACKGROUND

Some businesses use online advertising to entice consumers to buy products and services. One advertising technique utilized is called advertisement retargeting or simply retargeting. Retargeting generally involves targeted advertising based on a user's online activities, e.g., web browsing and/or search history. For example, retargeting may involve using a web beacon (e.g., HTML and/or JavaScript code) within a webpage or email to track or tag online users. The web beacon may trigger a web browser to store one or more cookies (e.g., data files) containing information associated with a website or a web domain, where these cookie can include browsing, searching, and/or viewing information, e.g., searched-for products, shopping cart data, and/or other information.

Retargeting may also involve an advertiser or a retargeting provider purchasing advertisement spots on a number of websites. As a user visits these websites, cookies associated with retargeting can be used to display targeted advertisements in these spots. For example, when a web browser loads a website 'B' that contains an advertisement, the web browser may request, from a retargeting server, an advertisement based on a cookie indicating that a baby stroller was added to a user's online shopping cart at website 'A'. In this example, the retargeting server may provide an advertisement for buying the baby stroller at website 'A'.

While retargeting can be effective at enticing consumers to complete purchases of some products, retargeting can be significantly less effective if advertised products are already purchased. Accordingly, it can be beneficial to suppress retargeting in such scenarios.

SUMMARY

Methods, systems, and computer readable media for suppressing cookie based advertisement retargeting are disclosed. One method includes receiving a digital identifier and a merchant identifier associated with a purchase transaction. The method further includes determining, using the digital identifier and the merchant identifier, whether a cookie exists for advertisement retargeting related to the digital identifier and the merchant identifier. The method also includes in response to determining that the cookie exists for advertisement retargeting related to the digital identifier and the merchant identifier, sending suppression information for suppressing advertisement retargeting associated with the cookie.

One system includes at least one processor, a memory, and a retargeting suppression engine implemented using the at least one processor and the memory. The retargeting suppression engine is configured for receiving a digital identifier and a merchant identifier associated with a purchase transaction; for determining, using the digital identifier and the merchant identifier, whether a cookie exists for advertisement retargeting related to the digital identifier and the merchant identifier; and in response to determining that the cookie exists for advertisement retargeting related to the digital identifier and the merchant identifier, for sending suppression information for suppressing advertisement retargeting associated with the cookie.

The subject matter described herein may be implemented in software in combination with hardware and/or firmware. For example, the subject matter described herein may be implemented in software executed by a processor. In some implementations, the subject matter described herein may be implemented using a computer readable medium having stored thereon computer executable instructions that when executed by the processor of a computer control the computer to perform steps. Example computer readable media suitable for implementing the subject matter described herein include non-transitory computer readable media and/or related devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to at least one physical computing platform including at least one processor and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 3 is a diagram illustrating data associated with advertisement retargeting;

DETAILED DESCRIPTION

Figure 1:
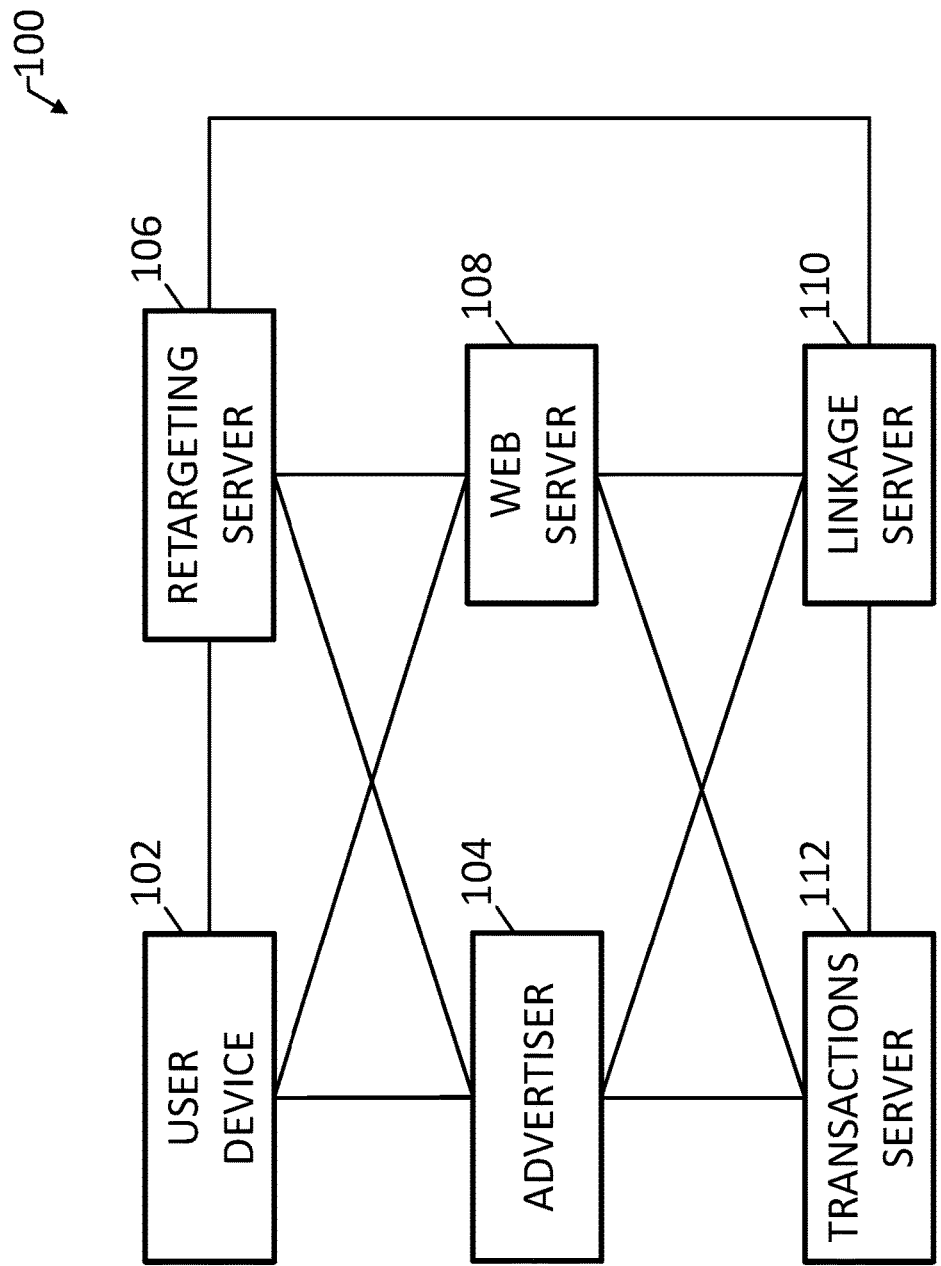
FIG. 1 is a block diagram illustrating a communications environment for suppressing cookie based advertisement retargeting.

FIG. 1 is a block diagram illustrating a communications environment 100 for suppressing cookie based advertisement retargeting. Communications environment 100 may include a user device 102, an advertiser 104, a retargeting server 106, a web server 108, a linkage server 110, and a transactions server 112. User device 102 may represent any suitable entity (e.g., a smartphone or a computer) for allowing a user to interact with communications environment 100 or entities therein. For example, user device 102 may be a computer, a tablet computer, a smartphone, and/or other device for browsing webpages from web server 108 or accessing the Internet.

User device 102 may include communications interfaces for receiving and sending various messages using wireless and/or wired technologies. For example, user device 102 may communicate with various entities (e.g., advertiser 104 and/or web server 108) using various messages and/or protocols. Example protocols may include an extensible markup language (XML) protocol, a hypertext transfer protocol (HTTP), an Internet protocol (IP) protocol, and/or other protocols.

User device 102 may also include at least one processor and memory for storing software and/or applications. In some embodiments, user device 102 may include a web browser or other application for accessing and/or viewing websites, e.g., e-commerce websites for purchasing products and/or services. In some embodiments, user device 102 may also include a digital wallet application for storing and using virtual payment cards, e.g., when purchasing products and/or services online.

Advertiser 104 may represent any suitable entity (e.g., one or more servers or computing platforms) for triggering cookie based advertisement retargeting. For example, advertiser 104 may represent an e-commerce website or a related web server that serves webpages containing web beacons, also referred to as pixels, for triggering user device 102 to download cookies usable for advertisement retargeting and/or containing information about a user's online (e.g., browsing and/or shopping) activities. In this example, as the user visits different affiliated websites, advertiser 104 and/or retargeting server 106 may provide advertisements based on these cookies.

Retargeting server 106 may represent any suitable entity (e.g., one or more servers or computing platforms) for facilitating cookie based advertisement retargeting. For example, retargeting server 106 may represent an advertisement exchange or a related server that manages and/or controls (e.g., auctions) advertisement spots across a number of websites. In this example, retargeting server 106 may dynamically serve, e.g., on a per view or on a per user device basis, advertisements based on cookie data.

Web server 108 may represent any suitable entity (e.g., one or more servers or computing platforms) for providing webpages containing advertisements. For example, web server 108 may represent a media website or a related web server that serves webpages containing advertisement spots controlled or managed by retargeting server 106. In this example, after receiving a webpage from web server 108 (e.g., via an HTTP response message), user device 102 or a web browser therein may identify an advertisement spot in the webpage and may request an advertisement from retargeting server 106 (e.g., via an HTTP GET message or HTTP POST message containing cookie data as parameters). Continuing with this example, user device 102 or a web browser therein may receive the advertisement from retargeting server 106 (e.g., via an HTTP '200 OK' response message containing an advertisement image or a related media file) and may display the received advertisement along with the webpage.

Linkage server 110 may represent any suitable entity (e.g., one or more servers or computing platforms) for data onboarding or linking data from one or more sources and/or contexts. For example, linkage server 110 may represent a data onboarder (e.g., LiveRamp) or a related server that links online information with user and/or device information. In this example, linkage server 110 may receive cookie identifiers and/or other information from advertiser 104 and/or retargeting server 106 and may receive user and/or device information from user device 102 and/or transactions server 112. Continuing with this example, linkage server 110 may link or associate this information such that the information is usable to identify devices, users, and/or retargeting related cookies associated with purchase transactions.

In some embodiments, linkage server 110 may include functionality (e.g., software executing on at least one processor) for suppressing cookie based advertisement retargeting. For example, linkage server 110 may periodically receive transaction information about a number of purchase transactions from transactions server 112 and may use the transaction information to identify any retargeting related cookies associated with these transactions. In this example, linkage server 110 may send suppression information (e.g., an exposure file indicating which cookies and/or devices are to receive or are not to receive targeted advertisements) to retargeting server 106 for suppressing these cookies or advertisement retargeting associated with these cookies.

Transactions server 112 may represent any suitable entity (e.g., one or more servers or computing platforms) for providing transaction information and/or other information usable to suppress advertisement retargeting. For example, transactions server 112 may represent a payments system or a related server that maintains transaction information associated with digital or online purchases. In this example, transactions server 112 may provide transaction information (e.g., a merchant identifier for indicating the seller, a digital identifier for indicating the purchaser or a related device, and/or other information for each transaction) which may be usable for identifying whether a purchase transaction is associated with a cookie related to advertisement retargeting.

In some embodiments, transactions server 112 may be associated with one or more payment network providers or payment services (e.g., MasterCard, PayPal, Square, Visa, Discovery, American Express, etc.) and may receive transaction information related to purchases associated with these payment network providers or payment services. For example, transactions server 112 may receive transaction information for purchases made using any major payment network provider or digital payment service. In another example, transactions server 112 may be associated with a particular payment network provider and may receive transaction information related to purchases associated with the particular payment network provider.

It will be appreciated that FIG. 1 is for illustrative purposes and that various nodes and/or modules, locations, and/or functionality described above in relation to FIG. 1 may be changed, altered, added, or removed. For example, some entities and/or functions may be combined into a single entity, e.g., linkage server 110 and retargeting server 106 may be combined into a marketing and customer relationship management (MCRM) platform. In another example, some entities and/or functions may be distributed across multiple nodes and/or platforms.

Figure 2:
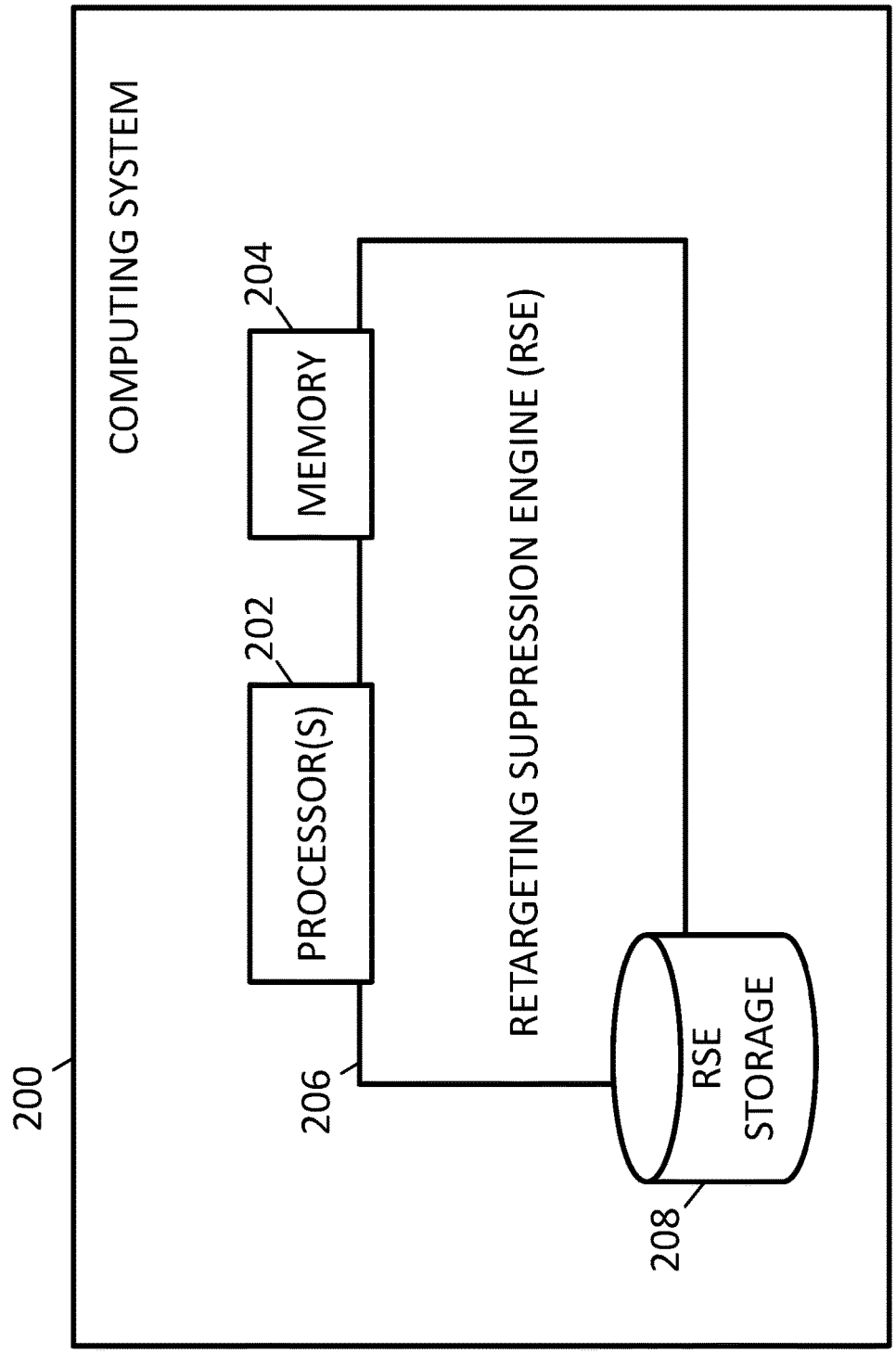
FIG. 2 is a block diagram illustrating a retargeting suppression engine for suppressing cookie based advertisement retargeting.

FIG. 2 is a block diagram illustrating a retargeting suppression engine (RSE) 206 for suppressing cookie based advertisement retargeting. Referring to FIG. 2, a computing system 200 may be any suitable entity (e.g., one or more computing devices, servers or computing platforms) for performing one or more aspects associated with suppressing cookie based advertisement retargeting.

Computing system 200 may include one or more processor(s) 202, a memory 204, RSE 206, and an RSE storage 208. Processor(s) 202 may represent a physical processor, a general purpose microprocessor, a single-core processor, a multi-core processor, a field-programmable gateway array (FPGA), and/or an application-specific integrated circuit (ASIC) for executing software and/or logic stored in memory 204. In some embodiments, e.g., where computing system 200 includes multiple processors, some processor(s) 202 may be configured to operate independently of other processor(s) 202. Memory 204 may represent one or more computer readable media for storing data, software, logic, or other information.

RSE 206 may be any suitable entity or entities (e.g., software executing on one or more processors and/or platforms) for performing one or more aspects associated with suppressing cookie based advertisement retargeting. In some embodiments, RSE 206 may be implemented using processor(s) 202 and/or memory 204. For example, RSE 206 may utilize processor(s) 202 (e.g., using software stored in memory 204) to receive a digital identifier (e.g., a cookie identifier, a user identifier, or a device identifier) and a merchant identifier (e.g., a merchant's name, a uniform resource locator (URL), a tax identifier number, or a product identifier) associated with a purchase transaction; to determine, using the digital identifier and the merchant identifier, whether a cookie exists for advertisement retargeting related to the digital identifier and the merchant identifier; and in response to determining that the cookie exists for advertisement retargeting related to the digital identifier and the merchant identifier, to send suppression information for suppressing advertisement retargeting associated with the cookie.

In some embodiments, RSE 206 or similar functionality may be implemented or distributed across user device 102, retargeting server 106, linkage server 110, and/or transactions server 112. For example, RSE 206 may involve multiple computers configured to perform various functions, such as linking cookie identifiers and user and/or device information, using transaction information to identify retargeting related cookies that are associated with purchase transactions, and suppressing advertisement retargeting associated with these cookies. In another example, RSE 206 may involve a single entity (e.g., linkage server 110) configured for linking cookie identifiers and user and/or device information, using transaction information to identify retargeting related cookies that are associated with purchase transactions, and suppressing advertisement retargeting associated with these cookies.

RSE storage 208 may be any suitable entity or entities (e.g., one or more memory devices) for storing information associated with suppressing cookie based advertisement retargeting. For example, RSE storage 208 may store transaction information, user and/or device information, cookie information, and other data usable for determining whether any retargeting related cookies are associated with purchase transactions.

It will be appreciated that FIG. 2 is for illustrative purposes and that various nodes and/or modules, engines, locations, and/or functionality described above in relation to FIG. 2 may be changed, altered, added, or removed.

FIG. 3 is a diagram illustrating example data 300 associated with suppressing advertisement retargeting. In some embodiments, data 300 may be accessed and/or provided by various entities in communications environment 100 (e.g., linkage server 110 or computing system 200) using various data structures. In some embodiments, data 300 may include any suitable information, such as one or more digital identifiers, merchant identifiers, and/or cookie identifiers, for associating a cookie and a transaction. In some embodiments, data 300 may be stored or maintained in RSE storage 208.

In some embodiments, data 300 may include at least some user and/or device information provided by transactions server 112 or other entities (e.g., user device 102) and at least some cookie information provided by retargeting server 106 or other entities (e.g., user device 102, advertiser 104, or web server 108), where the user and/or device information may be correlated with the cookie information.

Referring to FIG. 3, data 300 may be depicted using a table. For example, a table depicting data 300 may comprise columns and/or fields for a digital identifier representing a purchaser (e.g., buyer) associated with a purchase transaction, a merchant identifier representing a merchant (e.g., seller) associated with the purchase transaction, and a cookie identifier representing a cookie associated with the purchase transaction.

A digital identifier field value may comprise a value, a name, and/or a related identifier for indicating a particular purchaser associated with a purchase transaction. For example, a digital identifier field value may be a user identifier, a device identifier, a transaction identifier, a payment instrument identifier (e.g., a unique number associated with a physical or a virtual payment card), and/or a cookie identifier. In this example, the digital identifier may indicate a user, a cookie, and/or a user device associated with a purchase transaction.

A merchant identifier field value may comprise a value, a name, and/or a related identifier for indicating a particular merchant associated with a purchase transaction. For example, a merchant identifier field value may be a merchant URL, a tax identifier number, a merchant name, a product or service identifier, a merchant number, or a merchant location. In this example, the digital identifier field value may indicate a web address, a business, or a seller associated with a purchase transaction.

A cookie identifier field value may comprise a value, a name, and/or a related identifier for indicating a particular cookie associated with a purchase transaction. For example, a cookie identifier field value may be an attribute, name, and/or value in a cookie that identifies the cookie. In some embodiments, a cookie identifier field value may be the same as a digital identifier field values for one or more data entries.

In some embodiments, data 300 can be utilized for determining whether to suppress cookies associated with advertisement retargeting when a purchase transaction indicates that another advertisement is no longer needed, e.g., the user has already bought the advertised product. For example, sets of a digital identifier and a merchant identifier may be provided by transactions server 112 periodically to linkage server 110. In this example, each set of a digital identifier and a merchant identifier may represent one or more purchase transactions. Continuing with this example, linkage server 110 may identify a cookie identifier that matches or corresponds to the digital identifier and the merchant identifier of a particular set. If a corresponding cookie identifier is identified, linkage server 110 may determine that further advertisements based on a cookie identified by the cookie identifier are to be suppressed.

It will be appreciated that data 300 in FIG. 3 is for illustrative purposes and that different and/or additional information may also be stored or maintained. Further, it will be appreciated that data 300 may be stored in various data structures, memories, media, and/or in one or more locations.

Figure 4:
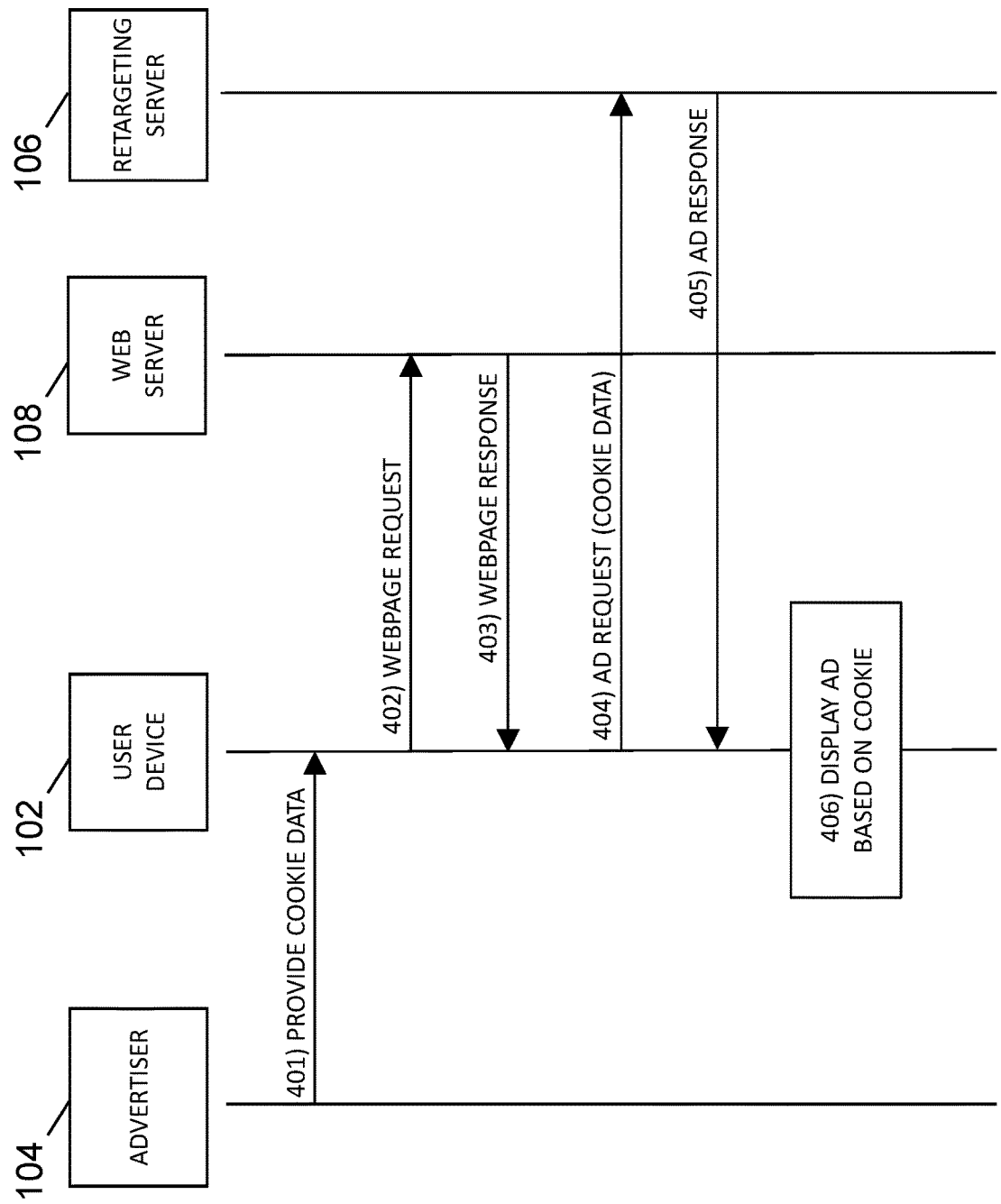
FIG. 4 is a diagram illustrating advertisement retargeting.

FIG. 4 is a diagram illustrating advertisement retargeting. In some embodiments, transactions server 112, linkage server 110, and/or retargeting server 106 may include RSE 206 or similar functionality. For example, RSE 206 may include logic or software that is distributed across transactions server 112, linkage server 110, and/or retargeting server 106. In another example, RSE 206 or similar functionality may be implemented at a single node, server, or platform.

Referring to FIG. 4, in step 401, cookie data may be sent from advertiser 104 to user device 102 or a web browser therein. For example, after a user visits a webpage (e.g., an e-commerce website) associated with advertiser 104 via a web browser executing on user device 102, advertiser 104 may provide a cookie (e.g., a data file that is associated with a web domain (e.g., 'Google.com') and stores information (e.g., browsing activity or session data) usable by a web browser or other application) to user device 102. In this example, the cookie may include a name or cookie identifier and information about one or more products or services that were viewed or searched-for by the user.

In some embodiments, advertiser 104 may use advertisement space (e.g., HTTP code indicating an image element) or web beacons or web bugs (e.g., one or more lines of JavaScript or other code) for tracking browser history and/or for causing a web browser to store one or more third-party cookies. For example, a third-party cookie may store searched-for products associated with advertiser 104 and may indicate a domain associated with retargeting server 106. In this example, retargeting server 106 may have advertisement space across multiple websites.

In step 402, a webpage request (e.g., an HTTP request message) may be sent from user device 102 to web server 108. For example, using a web browser, a user may request a news website (e.g., 'www.CNN.com'). In this example, the webpage request may be an HTTP GET message.

In step 403, a webpage response (e.g., an HTTP response message) may be sent from web server 108 to user device 102. For example, an HTTP '200 OK' message may include HTML and/or other information associated with a webpage. In this example, the webpage may include an advertisement space (e.g., an HTML <img> tag) and may be associated with a cookie stored at user device 102.

In some embodiments, user device 102 or a web browser therein may identify an advertisement space on a webpage and determine that an image file or other data should be retrieved before or while displaying the webpage. In some embodiments, user device 102 or a web browser therein may consult a related cookie (e.g., the advertisement space may indicate a web domain associated with a particular stored cookie) to identify a product identifier, an image URL, or other data (e.g., a preferred image size or format) associated with a searched-for product related to advertiser 104.

In step 404, user device 102 or a web browser therein may use the cookie data to request an advertisement (e.g., a coupon, an image, or a video) from retargeting server 106. For example, user device 102 or a web browser therein may send an HTTP GET message to retargeting server 106. In this example, the HTTP GET message may include parameter data that indicates a product identifier, an image URL, or other data such that retargeting server 106 can provide an advertisement for a searched-for product associated with cookie data from advertiser 104 or a related website.

In step 405, retargeting server 106 may send an advertisement (e.g., an image) to user device 102 or a web browser therein. For example, an HTTP '200 OK' message may include an image and/or other information associated with a particular advertisement. In this example, the advertisement may be for a searched-for product associated with advertiser 104 or a related website.

In step 406, user device 102 or a web browser therein may display the advertisement in the webpage. For example, an image file depicting an advertisement for a searched-for product of advertiser 104 may be retrieved from retargeting server 106 and displayed in a webpage at a particular location and size via a web browser executing on user device 102.

It will be appreciated that FIG. 4 is for illustrative purposes and that different and/or additional messages and/or actions may be used. It will also be appreciated that various messages and/or actions described herein may occur in a different order or sequence.

Figure 5:
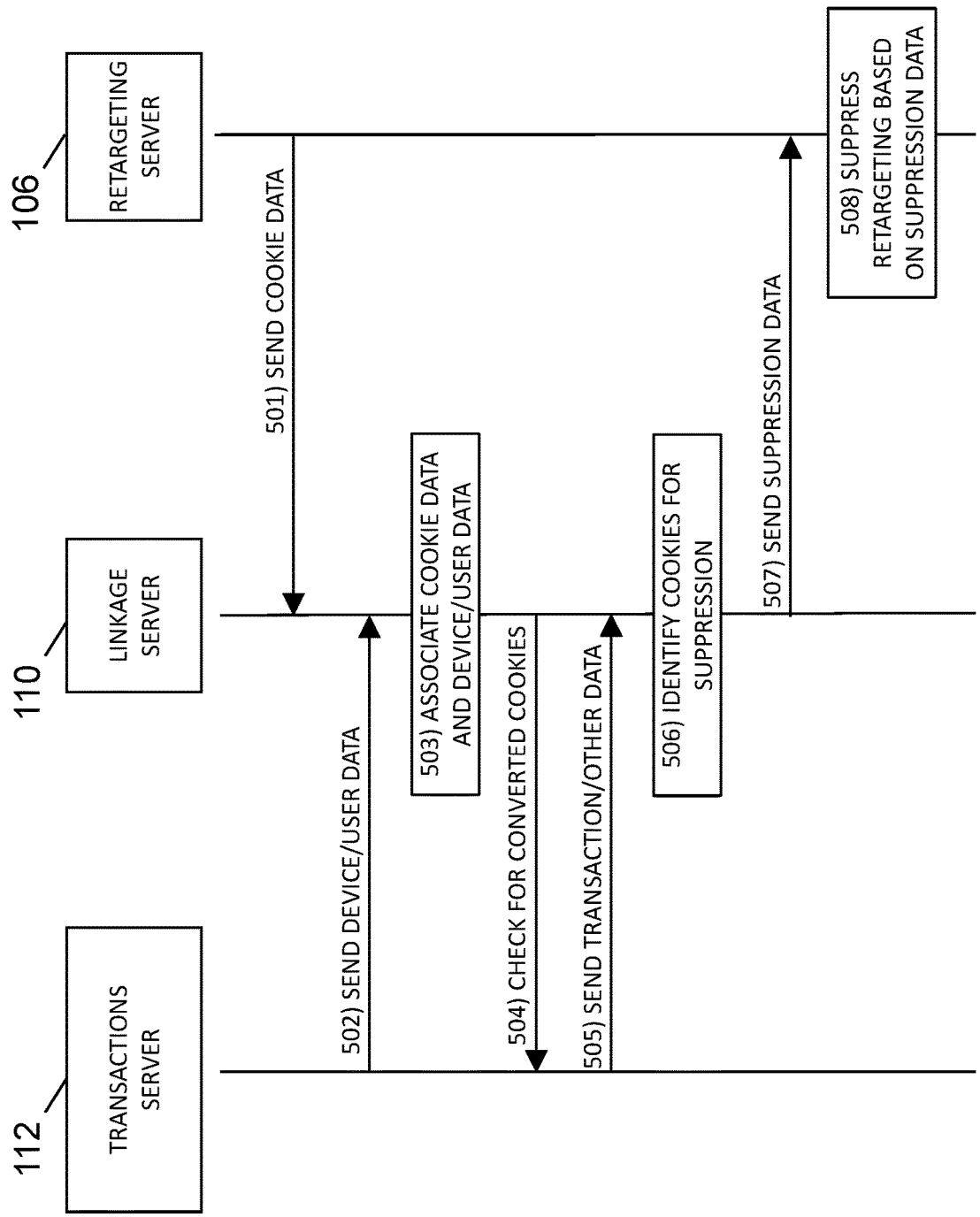
FIG. 5 is a diagram illustrating suppressing advertisement retargeting.

FIG. 5 is a diagram illustrating suppressing advertisement retargeting. In some embodiments, transactions server 112, linkage server 110, and/or retargeting server 106 may include RSE 206 or similar functionality. For example, RSE 206 may include logic or software that is distributed across transactions server 112, linkage server 110, and/or retargeting server 106. In another example, RSE 206 or similar functionality may be implemented at a single node, server, or platform.

Referring to FIG. 5, in step 501, cookie data may be sent from retargeting server 106 to linkage server 110. For example, periodically (e.g., daily or hourly) or aperiodically (e.g., dynamically or on request), retargeting server 106 may send a number of cookie identifiers that are associated with advertisement retargeting.

In some embodiments, user device 102 and/or advertiser 104 may provide cookie data that is associated with advertisement retargeting. For example, user device 102 or a digital wallet application therein may be configured to provide cookie data and/or other information (e.g., anonymized purchase information) to linkage server 110.

In step 502, device and/or user data may be sent from transactions server 112 to linkage server 110. For example, periodically or aperiodically, transactions server 112 may send digital identifiers (e.g., device identifiers, user identifiers, etc.) or other information associated with purchase transactions.

In some embodiments, user device 102 and/or advertiser 104 may provide device and/or user data. For example, advertiser 104 may be configured to provide a unique device or user identifier that is anonymized to linkage server 110.

In step 503, linkage server 110 may associate or link received cookie data and user and/or device data. For example, linkage server 110 may identify digital identifiers in received cookie data that match digital identifiers in received device and/or user data. In this example, linkage server 110 may store these associations in one or more data sets (e.g., a data structure). Continuing with this example, the one or more data sets may be used to identify or determine when a transaction occurs that involves a user, a device, or a product associated with advertisement retargeting.

In some embodiments, linkage server 110 may include data 300. For example, linkage server 110 may include a number of data entries, where each data entry may indicate that a cookie identifier is associated with a particular digital identifier (e.g., an electronic serial number (ESN), a mobile equipment identifier (MEID), an international mobile equipment identity (IMEI), an international mobile subscriber identity (IMSI)) and a particular merchant identifier.

In step 504, linkage server 110 may check for converted cookies (e.g., a cookie indicating a product or a service to advertise that has been purchased). For example, linkage server 110 may utilize an application programming interface (API) or other techniques to request transaction information or other information usable for determining whether any purchase transactions occurred that are associated with cookies related to advertisement retargeting. In this example, an API call or a request message for such information may be sent periodically or aperiodically (e.g., dynamically).

In step 505, transactions server 112 may send transaction information or other information usable for determining whether any purchase transactions occurred that are associated with cookies related to advertisement retargeting. For example, periodically or aperiodically, transactions server 112 may send a merchant identifier (e.g., a merchant name or a website address) and a digital identifier (e.g., a device identifier or a cookie identifier) for each of a number of purchase transactions. In this example, the number of transactions may be determined based on various factors, such as a maximum size of a message or a file used to provide the information and/or a length of time between the last check for converted cookies.

In some embodiments, transactions server 112 may include one or more algorithms or techniques (e.g., an inferred match methodology) to identify or infer a digital identifier associated with a transaction. For example, transactions server 112 may correlate historical transactions having similar attributes that are uncommon (e.g., not default or generic values). In this example, if at least one of the correlated transactions indicates a device identifier or a user identifier, transactions server 112 may infer that the same device identifier or user identifier is associated with all of the correlated transactions.

In step 506, linkage server 110 may identify cookies for suppression. For example, linkage server 110 may use various information (e.g., a digital identifier and a merchant identifier) received from transactions server 112 to identify which cookies are to be suppressed such that an advertisement for a product or a service already purchased by a user is not displayed to the user.

In step 507, suppression information (e.g., cookie identifiers) may be sent from linkage server 110 to retargeting server 106. For example, a message or a file indicating cookies that are allowed to trigger advertisement retargeting may be sent to retargeting server 106. In another example, a message or a file indicating cookies that are not allowed to trigger advertisement retargeting may be sent to retargeting server 106.

In step 508, retargeting server 106 may suppress advertisement retargeting based on suppression information received from linkage server 110. For example, assuming a list of cookie identifiers for advertisement retargeting are provided periodically by linkage server 110 to retargeting server 106, retargeting server 106 may avoid sending advertisements associated with cookies not in the list. In another example, if suppression information indicates products indicated in one or more cookies are not to be retargeted, retargeting server 106 may send alternate advertisements about other products, e.g., instead of advertisements for the products that are not to be retargeted.

It will be appreciated that FIG. 5 is for illustrative purposes and that different and/or additional messages and/or actions may be used. For example, step 505 may occur without step 504. In this example, transactions server 112 may send information to linkage server 110 without prompting or requesting by linkage server 110. It will also be appreciated that various messages and/or actions described herein may occur in a different order or sequence.

Figure 6:
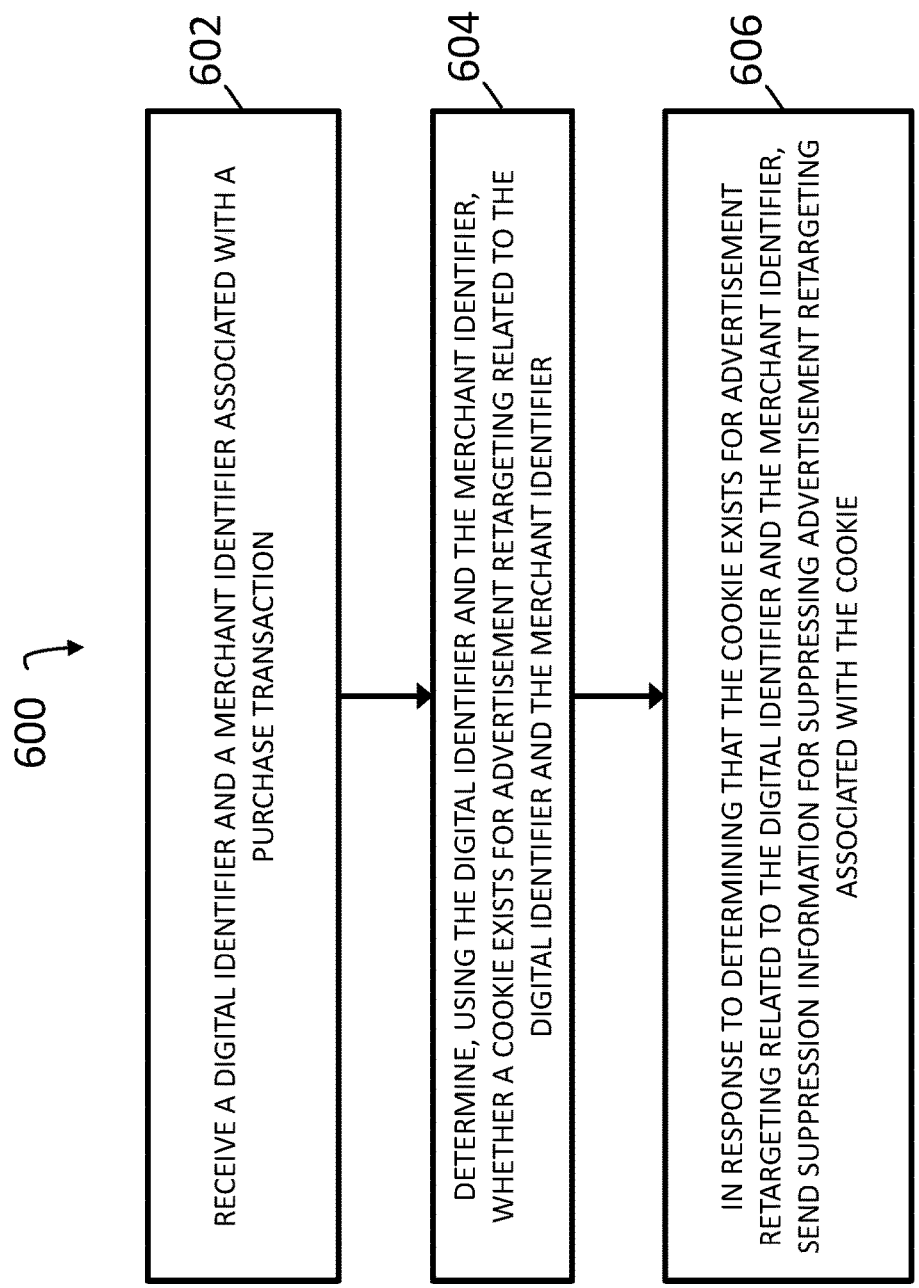
FIG. 6 is a diagram illustrating an example process for suppressing cookie based advertisement retargeting.

FIG. 6 is a diagram illustrating an example process for suppressing cookie based advertisement retargeting. In some embodiments, exemplary process 600, or portions thereof, may be performed by or at transactions server 112, linkage server 110, retargeting server 106, RSE 206, and/or another node or module.

Referring to process 600, in step 602, a digital identifier and a merchant identifier associated with a purchase transaction may be received. For example, during a purchase transaction involving a product, user device 102 and/or web server 108 may interact with transactions server 112. In this example, transactions server 112 may store transaction information (e.g., a digital identifier, a merchant identifier, a purchase price, etc.) regarding the purchase transaction. Continuing with this example, transactions server 112 may send at least some of the transaction information to linkage server 110 or another entity and linkage server 110 or another entity may associate the transaction with one or more relevant cookies or related cookies identifiers.

In some embodiments, a digital identifier may include a user identifier, a device identifier, a transaction identifier, a payment instrument identifier, and/or a cookie identifier.

In some embodiments, a merchant identifier may include a merchant URL, a tax identifier number, a merchant name, a product or service identifier, a merchant number, and/or a merchant location.

In step 604, it may be determined, using the digital identifier and the merchant identifier, whether a cookie exists for advertisement retargeting related to the digital identifier and the merchant identifier. For example, linkage server 110 or another entity may store a data set containing data entries that associate one or more digital identifiers (e.g., cookie identifiers, device identifiers, user identifiers, etc.) and/or other information (e.g., purchase information, merchant information, payment instrument information, etc.), where each data entry may also include a cookie identifier indicating a particular cookie for advertisement retargeting. In this example, linkage server 110 or another entity may query or search the data set using a particular digital identifier and/or a particular merchant identifier and may identify a relevant data entry associated with the particular digital identifier and/or the particular merchant identifier.

In some embodiments, a digital identifier may be a device identifier and determining that a cookie exists for advertisement retargeting may include identifying, in a data set, a data entry associated with the device identifier and a merchant identifier, wherein the data entry may include a cookie identifier and user information.

In some embodiments, a digital identifier may be a cookie identifier and determining that a cookie exists for advertisement retargeting may include identifying, in a data set, a data entry associated with the cookie identifier and a merchant identifier, wherein the data entry may include a matching cookie identifier and user information.

In some embodiments, user information may include a transactions history, an age range, an occupation, a credit history, a device identifier, or a user identifier.

In step 606, in response to determining that the cookie exists for advertisement retargeting related to the digital identifier and the merchant identifier, suppression information for suppressing advertisement retargeting associated with the cookie may be sent. For example, transactions server 112 or linkage server 110 may send a message containing suppression information, e.g., cookie identifiers for indicating which cookies are allowed or not allowed to be used for retargeting. In this example, the message may be for triggering retargeting server 106 or another entity to suppress advertisements of a product, a website, or a merchant indicated by the cookie. In some embodiments, suppression information may include a cookie identifier, a user identifier, a device identifier, and/or a merchant identifier.

In some embodiments, retargeting server 106 may receive suppression information and may suppress, using the suppression information, advertisement retargeting associated with a cookie.

In some embodiments, suppressing advertisement retargeting associated with a cookie may include providing, to a requesting entity, advertisement information for a first product that is different from a second product indicated in the cookie. For example, after receiving suppression information associated with a particular cookie or user from RSE 206 or a related entity, retargeting server 106 may still provide an advertisement for placement in a webpage displayed to the user, but the advertisement may be generic, for an unpurchased product, or determined not using cookie information.

In some embodiments, computing system 200, RSE 206, and/or functionality described herein may provide retargeting suppression features or other aspects described herein as an opt-in service or an opt-out service. For example, users may opt-in (e.g., enroll and/or agree) to receive one or more features. In this example, by agreeing to receive these features, the users may also agree to provide relevant information (e.g., information about themselves, user devices, online purchases, browsing history, etc.) to one or more entities for use in determining relevant advertisements and/or to avoid receiving irrelevant advertisements. In another example, users may automatically be enrolled to receive one or more features, but may opt-out (e.g., dis-enroll) by indicating to a relevant entity that they do not want to receive these features and/or they do not want to provide or share information needed for such features.

In some embodiments, computing system 200, RSE 206, and/or functionality described herein may provide retargeting suppression features or other aspects described herein in a manner that is consistent with all applicable privacy laws and consumer protection laws.

It should be noted that computing system 200, RSE 206, and/or functionality described herein may constitute one or more special purpose computing device(s). Further, computing system 200, RSE 206, and/or functionality described herein can improve the technological field of customer relationship management (CRM) and/or marketing management. For example, by suppressing retargeting related cookies when transactions indicate that targeted advertisements are unlikely to result in sales, advertisers (e.g., advertiser 104) can more effectively use an advertisement and/or marketing budget, e.g., by targeting users that have yet to purchase products associated with the targeted advertisements. Further, by using less sensitive transaction information (e.g., a cookie identifier, a merchant identifier, and/or anonymized data) to determine whether related cookies should be suppressed, privacy issues are minimized.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for suppressing advertisement retargeting, the method comprising:
    at a marketing and customer relationship management (MCRM) platform comprising a linkage server and a retargeting server:
    at the linkage server, wherein the linkage server is configured to communicate with the retargeting server that controls advertisement retargeting to a plurality of users and to communicate with a transactions server in a payment network:
        receiving cookie data from the retargeting server, wherein the cookie data indicates a set of cookies for advertisement retargeting to the plurality of users;
        receiving, from the transactions server, digital identifiers and merchant identifiers associated with purchase transactions involving the plurality of users;
        determining, using the cookie data, the digital identifiers, and the merchant identifiers, cookies of the set of cookies for advertisement retargeting are no longer needed, wherein at least one of the cookies is associated with a first user that is different from a second user associated with another of the cookies; and
        in response to determining that the cookies for advertisement retargeting are no longer needed, sending, to the retargeting server, suppression information for suppressing advertisement retargeting associated with the cookies, wherein the suppression information indicates users' devices that are not to receive targeted advertisements; and
    at the retargeting server:
        receiving the suppression information; and
        suppressing, using the suppression information, advertisement retargeting associated with the cookies.

2. The method of claim 1 wherein suppressing advertisement retargeting associated with the cookies includes providing, to a requesting entity, advertisement information for a first product that is different from a second product indicated in one of the cookies.

3. The method of claim 1 wherein the suppression information includes a cookie identifier, a user identifier, a device identifier, or one of the merchant identifiers.

4. The method of claim 1 wherein one of the digital identifiers includes a user identifier, a device identifier, a transaction identifier, a payment instrument identifier, or a cookie identifier.

5. The method of claim 1 wherein one of the merchant identifiers includes a merchant uniform resource locator (URL), a tax identifier number, a merchant name, a product or service identifier, a merchant number, or a merchant location.

6. The method of claim 1 wherein one of the digital identifiers is a device identifier and wherein determining that at least one of the cookies for advertisement retargeting is no longer needed includes identifying, in a data set, a data entry associated with the device identifier and one of the merchant identifiers, wherein the data entry includes a cookie identifier and user information.

7. The method of claim 1 wherein one of the digital identifiers is a cookie identifier and wherein determining that at least one of the cookies for advertisement retargeting is no longer needed includes identifying, in a data set, a data entry associated with the cookie identifier and one of the merchant identifiers, wherein the data entry includes a matching cookie identifier and user information.

8. The method of claim 7 wherein the user information includes a transactions history, an age range, an occupation, a credit history, a device identifier, or a user identifier.

9. A system for suppressing cookie based advertisement retargeting, the system comprising:
a marketing and customer relationship management (MCRM) platform comprising a linkage server and a retargeting server:
the linkage server is configured to communicate with a retargeting server that controls advertisement retargeting and to communicate with a transactions server in a payment network, the linkage server comprising:
a memory;
at least one processor; and
a retargeting suppression engine implemented using the at least one processor and the memory, wherein the retargeting suppression engine is configured for:
receiving cookie data from a retargeting server, wherein the cookie data indicates a set of cookies for advertisement retargeting;
receiving, from the transactions server, digital identifiers and merchant identifiers associated with purchase transactions involving a plurality of users;
determining, using the cookie data, the digital identifiers, and the merchant identifiers, cookies of the set of cookies for advertisement retargeting are no longer needed, wherein at least one of the cookies is associated with a first user that is different from a second user associated with another of the cookies; and
in response to determining that the cookies for advertisement retargeting are no longer needed, sending suppression information for suppressing advertisement retargeting associated with the cookies, wherein the suppression information indicates users' devices that are not to receive targeted advertisements; and
the retargeting server configured for:
receiving the suppression information; and
suppressing, using the suppression information, advertisement retargeting associated with the cookies.

10. The system of claim 9 wherein suppressing advertisement retargeting associated with the cookies includes providing, to a requesting entity, advertisement information for a first product that is different from a second product indicated in one of the cookies.

11. The system of claim 9 wherein the suppression information includes a cookie identifier, a user identifier, a device identifier, or one of the merchant identifiers.

12. The system of claim 9 wherein one of the digital identifiers includes a user identifier, a device identifier, a transaction identifier, a payment instrument identifier, or a cookie identifier.

13. The system of claim 9 wherein one of the merchant identifiers includes a merchant uniform resource locator (URL), a merchant name, a tax identifier number, a product or service identifier, a merchant number, or a merchant location.

14. The system of claim 9 wherein one of the digital identifiers is a device identifier and wherein determining that at least one of the cookies for advertisement retargeting is no longer needed includes identifying, in a data set, a data entry associated with the device identifier and one of the merchant identifiers, wherein the data entry includes a cookie identifier and user information.

15. The system of claim 9 wherein one of the digital identifiers is a cookie identifier and wherein determining that at least one of the cookies for advertisement retargeting is no longer needed includes identifying, in a data set, a data entry associated with the cookie identifier and one of the merchant identifiers, wherein the data entry includes a matching cookie identifier and user information.

16. The system of claim 15 wherein the user information includes a transactions history, an age range, an occupation, a credit history, a device identifier, or a user identifier.

17. One or more non-transitory computer readable media storing instructions for at least one processor that, when executed by the at least one processor, cause the at least one processor to suppress advertisement retargeting by performing operations comprising:
at a marketing and customer relationship management (MCRM) platform comprising a linkage server and a retargeting server:
at the linkage server, wherein the linkage server is configured to communicate with the retargeting server that controls advertisement retargeting to a plurality of users and to communicate with a transactions server in a payment network:
receiving cookie data from the retargeting server, wherein the cookie data indicates a set of cookies for advertisement retargeting to the plurality of users;
receiving, from the transactions server, digital identifiers and merchant identifiers associated with purchase transactions involving the plurality of users;
determining, using the cookie data, the digital identifiers, and the merchant identifiers, cookies of the set of cookies for advertisement retargeting are no longer needed, wherein at least one of the cookies is associated with a first user that is different from a second user associated with another of the cookies; and
in response to determining that the cookies for advertisement retargeting are no longer needed, sending, to the retargeting server, suppression information for suppressing advertisement retargeting associated with the cookies, wherein the suppression information indicates users' devices that are not to receive targeted advertisements; and
at the retargeting server:
receiving the suppression information; and
suppressing, using the suppression information, advertisement retargeting associated with the cookies.

18. The one or more non-transitory computer readable media of claim 17 wherein the suppression information includes a cookie identifier, a user identifier, a device identifier, or one of the merchant identifiers.

* * * * *